J. R. WILLIAMS.
CATCH BASIN AND TRAP.
APPLICATION FILED SEPT. 24, 1908.
913,338.
Patented Feb. 23, 1909.
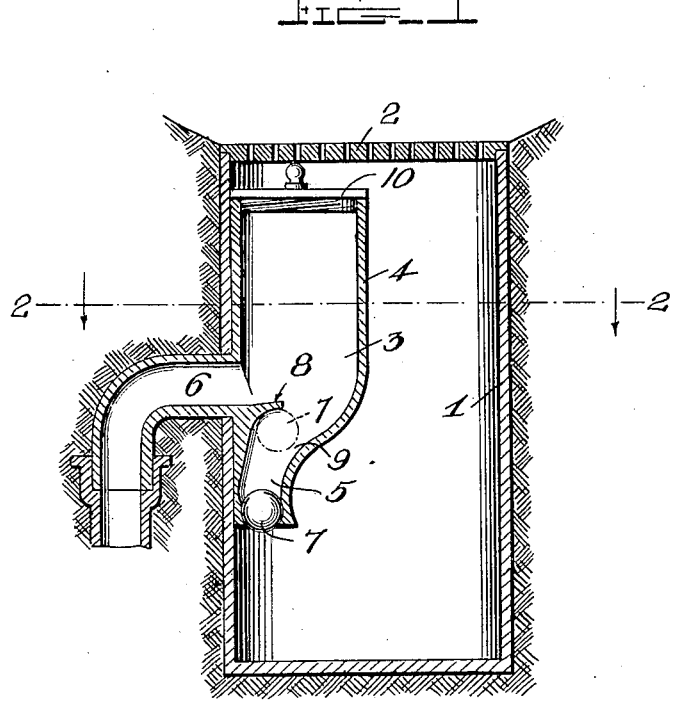
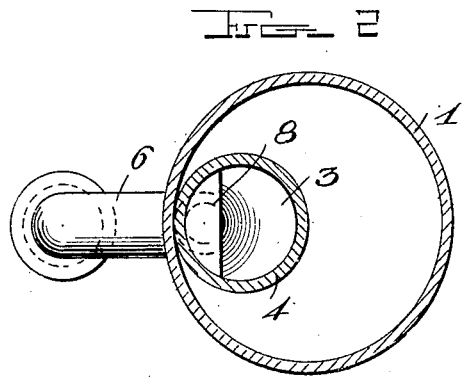
Witnesses
C. H. Griesbauer
Inventor
J. R. Williams
By H. R. Willson &co
Attorneys

UNITED STATES PATENT OFFICE.

JOHN R. WILLIAMS, OF MILWAUKEE, WISCONSIN.

CATCH-BASIN AND TRAP.

No. 913,338.          Specification of Letters Patent.          Patented Feb. 23, 1909.

Application filed September 24, 1908. Serial No. 454,510.

*To all whom it may concern:*

Be it known that I, JOHN R. WILLIAMS, a citizen of the United States, residing at Milwaukee, in the county of Milwaukee and State of Wisconsin, have invented certain new and useful Improvements in Catch-Basins and Traps; and I do declare the following to be a full, clear, and exact description of the invention, such as will enable others skilled in the art to which it appertains to make and use the same.

This invention relates to improvements in catch basins or traps for cellar drainage and has for its object the production of a simple and efficiently operating device of this kind which may be installed in position with great facility and will answer all requirements to be expected of a trap of this kind.

The further object of this invention is to so construct the device that the dirt or sediment will collect at the bottom of the catch basin and will therefore not "choke-up" the trap, thus obviating the necessity of frequently cleaning the latter.

With this and other objects in view, the invention consists of certain novel features of construction, combination and arrangement of parts, as will be more fully described and particularly pointed out in the appended claims.

In the accompanying drawings, Figure 1 is a central vertical section of a catch basin and trap constructed in accordance with the invention; and Fig. 2 is a horizontal section taken on the plane indicated by the dotted lines 2—2 of Fig. 1.

In the embodiment illustrated, the device comprises a cylindrical catch basin or casing 1 provided with a removable perforated cover 2. The trap 3 is arranged eccentrically within or at one side of the catch basin or casing and comprises a cylindrical body 4 of considerably less diameter than that of the catch basin or casing terminating at its lower end in a reduced extension 5 and provided at the junction of its body and said contracted portion 5 with a waste pipe 6. A ball float valve 7 is arranged in the extension 5 of the trap and is normally held or stationed at the outlet end of said reduced extension by an inwardly projecting shelf 8 formed at the outlet end thereof. The water in said contracted portion constitutes a seal which prevents the back flow of sewer gases, the back flow of any water being retarded by the valve 7 which is adapted to close the mouth of said contracted portion of the trap. A cover 10 is screwed to the upper end of the trap and provides means for gaining access to the interior thereof in case of stoppage as when "choked-up" by the accumulation of sediment in the contracted portion 5. The cover 10 being above the water line, it may be readily unscrewed and free access thereby had to the trap without the necessity of working in dirty water.

From the foregoing description, taken in connection with the drawings, it is thought that the advantages derived from the use of my catch basin will be apparent to those skilled in the art to which my invention appertains.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is:

1. A device of the class described comprising a cylindrical casing and a hollow cylindrical trap open at both ends arranged eccentrically within and at one side of the casing, the lower end of the trap terminating in a reduced cylindrical extension, a ball float valve normally seating in the extension of the trap, and an inwardly projecting shelf formed at the upper end of said extension, said shelf forming a guard to prevent the float valve from passing above the upper or outlet end of the extension into the body of the trap.

2. A trap for catch basins comprising a hollow body open at both ends and provided at its lower end with a reduced cylindrical eccentrically disposed extension forming an inlet passage, a float valve arranged in said extension, a horizontal shelf formed at the upper or discharge end of the extension, said shelf forming a guard to confine or hold the float valve in the extension and against passing into the body of the trap, and a removable cover to close the upper end of the trap.

3. In a device of the class described, a hollow cylindrical trap open at both ends and comprising a cylindrical body terminating at its lower end in a reduced cylindrical extension, a ball float normally seating in the extension of the trap and an inwardly projecting shelf formed at the upper end of said extension and forming a guard to prevent the float valve from passing above the upper or outlet end of the extension into the body of the trap.

4. In a device of the class described comprising a cylindrical casing, a hollow cylindrical trap open at both ends and arranged within and at one side of the casing, said trap comprising a cylindrical body provided at its lower end with a reduced cylindrical eccentrically disposed portion or extension, a float valve arranged in the extension of the trap, an inwardly horizontally projecting shelf formed at the upper end of said extension and forming a guard to prevent the float valve from passing through the upper or outlet end of the extension into the body of the trap.

In testimony whereof I have hereunto set my hand in presence of two subscribing witnesses.

JOHN R. WILLIAMS.

Witnesses:
 WILLIAM MEREDITH, Jr.,
 CHARLES E. HICKMAN.